United States Patent
Taylor et al.

(10) Patent No.: US 8,997,120 B1
(45) Date of Patent: Mar. 31, 2015

(54) LIGHTWEIGHT COMMUNICATION CHANNEL FOR CONTROL OF DEVICE DRIVER COMPONENTS

(75) Inventors: Alan Lee Taylor, Cary, NC (US); Paul T. McGrath, Raleigh, NC (US); Miles A. de Forest, Bahama, NC (US); Dayanand Suldhal, New Canaan, CT (US); Nagapraveen Veeravenkata Seela, Cary, NC (US); Samuel Lee Mullis, II, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 525 days.

(21) Appl. No.: 13/435,294

(22) Filed: Mar. 30, 2012

(51) Int. Cl.
*G06F 3/00* (2006.01)

(52) U.S. Cl.
CPC ..................................... *G06F 13/02* (2013.01)
USPC ......................................................... 719/321

(58) Field of Classification Search
None
See application file for complete search history.

(56) References Cited

U.S. PATENT DOCUMENTS

| | | | |
|---|---|---|---|
| 2005/0060436 A1* | 3/2005 | Kienhoefer | 710/1 |
| 2007/0046562 A1* | 3/2007 | Polivy et al. | 345/1.2 |
| 2007/0094673 A1* | 4/2007 | Hunt et al. | 719/321 |
| 2008/0276010 A1* | 11/2008 | Fuchs et al. | 710/8 |
| 2009/0271402 A1* | 10/2009 | Srinivasan et al. | 707/6 |

OTHER PUBLICATIONS

Hunt et al., Singularity: Rethinking the Software Stack, Apr. 2007, 13 pages.*
"IOCTL", from Wikipedia, www.wikipedia.org, revision dated Jan. 23, 2012.

* cited by examiner

*Primary Examiner* — H S Sough
*Assistant Examiner* — Carina Yun
(74) *Attorney, Agent, or Firm* — BainwoodHuang (57) ABSTRACT

In a data storage system, a fixture communication channel is created for communications between a fixture and another component, where the fixture is a component of a device driver that provides extended input/output functionality with respect to one or more storage devices. A handle identifies the fixture communication channel, and callbacks are registered with a driver handler and reference callback functions of the fixture. Fixture communication messages each include the handle and a message-specific operation code for an operation to be performed by the fixture, and each is conveyed by (1) issuing a fixture-control input/output control command to the handler that includes the handle and message-specific operation code, and (2) at the handler, using the handle and message-specific operation code to select a callback and invoke a corresponding callback function of the fixture.

14 Claims, 5 Drawing Sheets

LIGHTWEIGHT COMMUNICATION CHANNEL FOR CONTROL OF DEVICE DRIVER COMPONENTS

BACKGROUND

Device drivers are specialized computer programs that carry out input/output (I/O) operations initiated by application programs in a computer. Many device drivers are specific to particular I/O devices or classes of I/O devices, such as disk drives for example. Other device drivers may operate at a more abstract level. For example, device driver may be used to control and access a logical unit of storage that is made available for use by application programs and that utilizes real physical storage device(s) for underlying real physical storage capacity, where such physical storage devices also have respective device drivers. Many drivers, including those operating at more abstract levels, may be organized to selectively include modularized components that provide enhanced functionality over basis driver operation. In the context of drivers for storage devices or logical volumes, such modularized components can include components for performing data compression or data de-duplication for example.

There is a general need for application programs to exert direct control over the operation of device drivers and/or underlying logical or physical devices. It is known to use so-called "input-output control" or IOCTL commands in computers to support such control actions. More generally, there can be need for other types of components, including kernel components such as other drivers, to communicate with a driver. A component can generate an IOCTL command and cause the operating system to issue it to a device driver, where the IOCTL command is interpreted and causes the device driver to perform a corresponding action. Over time, existing operating systems have come to support a large library of IOCTL commands used by the various applications/components and devices that are supported.

SUMMARY

While IOCTL commands can be useful for communications between an application or similar component and a device driver, there can be drawbacks to their use. A device driver must either use existing IOCTL commands that may not be adequate for the communication needs for device driver functions, or a new set of IOCTL commands must be created and defined. The latter situation may require specific support by operating system(s) and/or other system elements, making it cumbersome and difficult to adopt and use an expanded set of IOCTL commands. Also, it may be necessary to use different variants of a set of IOCTL commands with different operating systems, for example, further complicating the design and use of device drivers. Such limitations also run directly contrary to the use of modularized components, which by definition should be capable of easy incorporation into a variety of system environments and even into the drivers that contain them—it would be undesirable to require modification of a driver merely to support specific communication needs of a constituent modularized component.

In general, the present disclosure is directed to a communication channel usable between a component such as an application and a modularized component of a device driver. Such modularized components are referred to as "fixtures" herein, and the channel referred to as a "fixture communication channel". The channel makes only limited use of a few specialized IOCTL commands, one command identifying itself as a control command that is transporting an operation code generated by the application. The application and fixture can be specially tailored to generate and use a variety of specialized operation codes, but all are carried using the same transport-type of IOCTL command. The device driver and other components need support only this small number of general-purpose IOCTL commands in order to enable communications among a wide variety of applications and fixtures. In this sense, the fixture communication channel has a "lightweight" characteristic, not burdening device drivers and other components with a requirement for supporting an extensive and changeable set of specialized IOCTL commands.

More particularly, a method is disclosed of operating a data storage system that includes creating a fixture communication channel for communications between a fixture and another component, where the fixture is a component of a device driver providing extended input/output functionality with respect to a storage device accessed via the device driver. The fixture communication channel includes a handle and a set of callbacks. The handle specifically identifies the fixture communication channel, and the callbacks reference respective callback functions of the fixture that provide the extended input/output functionality. The callbacks become registered with a handler responsible for invoking the device driver in response to input/output control commands directed to the storage device, the input/output control commands being of a variety of different types including a fixture-control type.

The method further includes using the fixture communication channel to convey contents of fixture communication messages between the other component and the fixture. Each fixture communication message includes the handle and a message-specific operation code for an operation to be performed by the fixture, and is conveyed by (1) generating an input/output control command of the fixture-control type and issuing it to the handler, the fixture-control input/output control command including the message-specific operation code and the handle from the fixture communication message, and (2) at the handler, using the handle and message-specific operation code from the fixture-control input/output control command to select a corresponding callback and invoke a corresponding callback function of the fixture.

The fixture communication channel supports rich communications between an application and a fixture without requiring the handler and other components to be designed with specific support for the set of operation codes used by the application to communicate with the fixture. Rather, the intermediate components merely effect a transport function along with the callback selection which is easily customizable in a given system using generic capabilities of the handler. Systems are more easily designed and deployed while still providing rich, current, and changeable functionality supported by the lightweight fixture communication channel.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
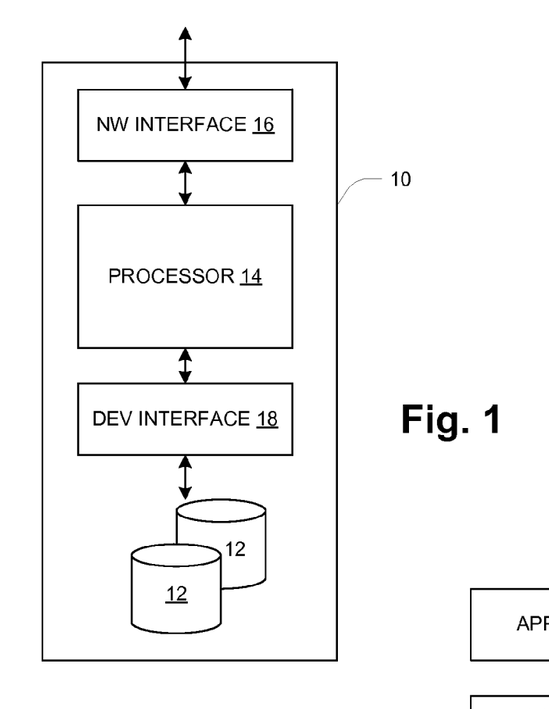
FIG. 1 is a hardware block diagram of a storage system.

FIG. 1 shows a storage system 10 from a hardware perspective. The storage system 10 includes storage devices 12 such as disk drives, processing circuitry (PROCESSOR) 14, network (NW) interface circuitry 16 for coupling the storage system 10 to an external network (not shown), and device (DEV) interface circuitry 18 for coupling the processing circuitry 14 to the storage devices 12. The storage system 10 may be of a type commonly referred to as "network-attached storage" or NAS, in which case the processing circuitry 14 typically implements a network file system and exposes storage resources as volumes of that file system (e.g., a network drive as commonly known in Windows® networks). In other cases the storage system 10 may be utilized in a direct-attached or storage area network (SAN) environment, in which case it typically exposes storage resources as logical units (LUNs) each being a linear array of addressable storage locations. In either case, the processing circuitry 14 under control of operating software uses the disks 12 as underlying physical storage for the volumes or LUNs exposed externally.

Figure 2:
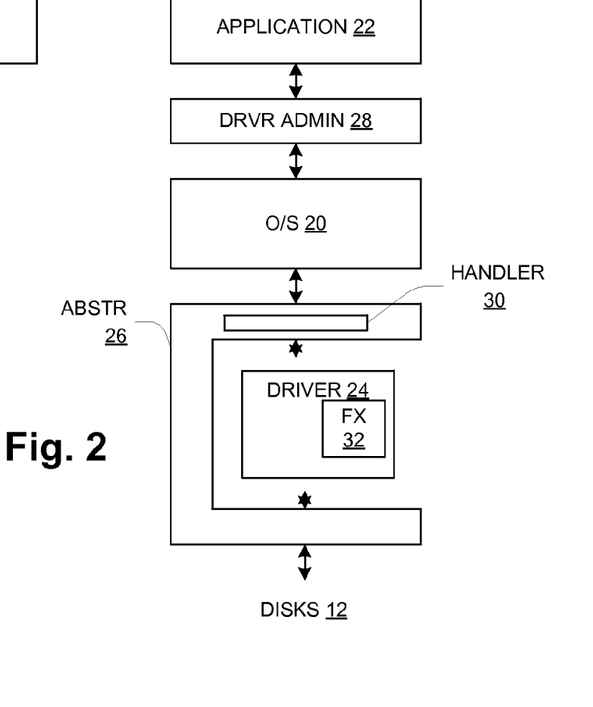
FIG. 2 is a block diagram of software-implemented components of the storage system.

FIG. 2 provides a block diagram of certain operating software executed by the processing circuitry 14. Elements include an operating system (O/S) 20, one or more applications 22, and a device driver complex that includes a driver 24 and an abstraction layer (ABSTR) 26. Software-implemented components such as any of those shown in FIG. 2 are to be understood as the processing circuitry 14 when executing instructions of a program, routine, module or other organization that causes the processing circuitry 14 to perform corresponding functions or operations, as generally known in the art. Thus in one embodiment the driver 24, for example, is the processing circuitry 14 executing instructions of a driver program. The application 22 is a user-space functional component providing desired functionality in a networked computer system, such as a network file system of a NAS configuration for example. The other components in FIG. 2 are generally system-space or kernel-space components having greater privileges for performing protected operations in the storage system 10 such as directly accessing hardware devices.

The driver 24 is functionally coupled to both the O/S 20 and the disks 12 via the abstraction layer 26. The abstraction layer 26 provides genericized interfaces to the driver 24 to enable a degree of driver portability between different operating systems and different hardware platforms. As shown, the O/S 20 includes a component referred to as a driver administrator (DRVR ADMIN) 28; the abstraction layer 26 includes a component referred to as a handler 30; and the driver 24 includes a component referred to as a fixture (FX) 32. In one embodiment, the driver 24 may be a driver for so-called "mapped logical units" or MLUs, which are a virtualized LUNs for which the underlying physical storage is allocated dynamically as needed, rather than statically. The use of MLUs may also be referred to as "thin provisioning". An MLU driver 24 may be used in conjunction with a driver administrator 28 for a variety of purposes, including for example configuration and control functions. The handler 30 has a function of handling the processing of input/output control ("IOCTL") commands issued by any of component 20, 22, 28 to perform storage operations (e.g., data reads and writes) to the LUNs under control of the driver 24.

The fixture 32 is a modularized component for a specific type of extended storage-related functionality that may be provided by the storage system 10. Examples include data de-duplication, compression, and zero detection. The fixture 32 may be included in the driver 24 as a configuration option (e.g., plug-in) when the storage system 10 is initially configured for use or when later reconfigured as part of an upgrade, for example.

As outlined above, it is necessary to provide operational communications between the application 22 and the fixture 32 to enable the application 22 to use the functions provided by the fixture 32. The communications are preferably provided in a manner that has low overhead, flexibility, and freedom from specific dependencies on the operating system 20. While the necessary communications could be achieved by creation and use of a set of fixture-oriented IOCTL commands, such an approach has the drawback of requiring complicated and customized IOCTL-related organization and processing, which generally runs counter to the above goals. Thus, as described below, a fixture communication channel or FCC is utilized that has characteristics more in line with these goals.

Figure 3:
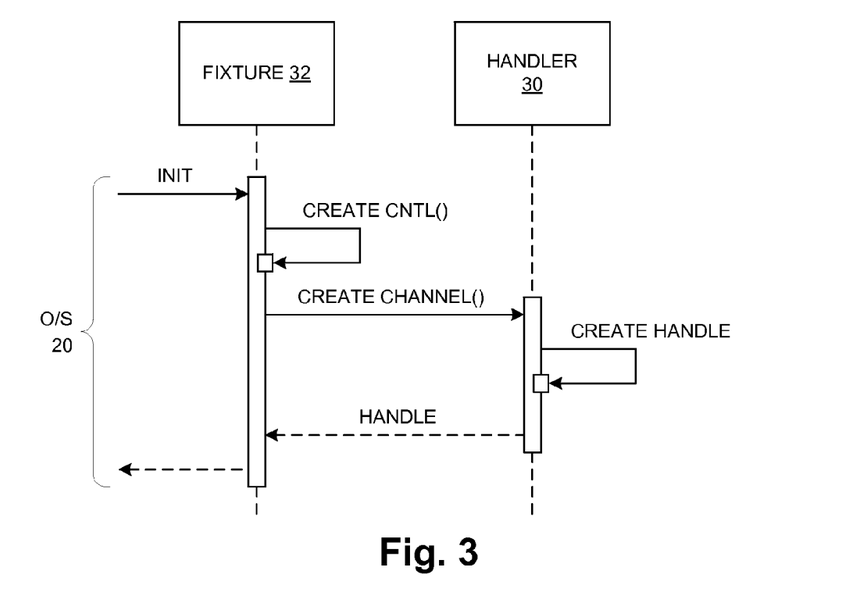
FIGS. 3-4 are message flow diagrams.
Figure 4:
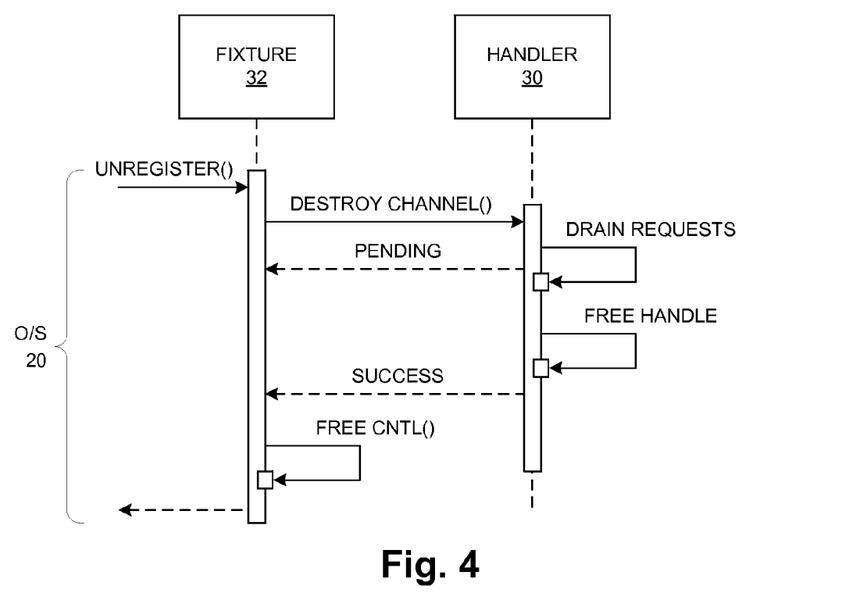

FIGS. 3 and 4 show message exchanges during procedures for creating and destroying an FCC respectively. The actors involved are the O/S 20, the handler 30 and the fixture 32. Operation begins with an event identified as INIT that accompanies initialization of the storage system 10 for operation, which may be a cold start or a restart for example. The fixture 32 creates a set of control structures (CREATE CNTL) and then issues a channel creation command (CREATE CHANNEL) to the handler 30. The parentheses indicate the inclusion of parameters in the command. The CREATE CHANNEL command includes the following parameters:

Channel Name
Callbacks
Fixture Context

The Channel Name is unique across all fixtures and is made available to the application 22 for use in identifying the FCC when later opened for use (described below). Callbacks are references to specific functions (callback functions) of the fixture 32 that are part of the higher-level extended functionality (e.g., de-duplication etc.) that it provides. Fixture Context is a reference to an area of memory (of the processing circuitry 14) to be used by the fixture 32 when performing operations related to the new FCC.

In response to the Create Channel command, the handler 30 stores the Callbacks and Fixture Context in association with an object name that identifies a storage object (e.g., LUN) referred to as an Administrative Volume. The handler 30 then creates a unique identifier value called a "Handle" for this set of data items. The Handle is returned to the fixture 32 where it is stored in association with the new FCC. By this process the Callbacks have become registered at the handler 30 to enable it to invoke corresponding callback functions of the fixture 32 during later use of the FCC. Among these functions are an Open callback function and a Close callback function used at the beginning and end of a communications session with an application 22. Also included are a Cancel callback and a Control callback for the functions pertaining to the specific system functionality provided by the fixture 32, e.g., functions of de-duplication, compression etc. depending on the fixture type.

The Cancel callback is executed by the handler 30 when the client no longer wishes to continue with a control request. For example, an abnormal application termination would generate an event to the handler 30 that executes the cancel callback. Each outstanding request is cancelled through a cancel callback. An example of such operation is described below.

The Control callback is how the application 22 delivers a control-type message to the fixture 32, specifically a message that includes an operation code, a pointer and length for an input buffer, and a pointer and length for an output buffer. The input buffer is populated by the application 22 and its contents used by the fixture 32 in performing a requested operation, and the output buffer is populated by the fixture 32 to return results of a requested operation to the application 22. As an example with respect to deduplication, a deduplication application may issue a "get-digest" command through the FCC. The "get-digest" command input buffer includes a scatter/gather list (SGL) of block offsets and lengths. A deduplication fixture calculates deduplication checksums/hashes for the data specified by the SGL and passes the computed values back to the application using the output buffer.

FIG. 4 describes the tearing down or "destroying" of an FCC, initiated during an event represented in FIG. 4 as "Unregister". The fixture 32 may destroy an FCC when dictated by functional requirements of the fixture 32. In some cases a fixture 32 may destroy an FCC during destruction of the fixture 32, during shutdown, and when the fixture 32 is disabled by a property change.

The fixture 32 issues a Destroy Channel( ) command to the handler 30 which specifies the Handle of the FCC and an asynchronous callback. The handler 30 invalidates the Handle, and will respond to any later-received user space requests directed to the Handle with an INVALID-HANDLE error response. If there is no asynchronous work to perform (e.g., no pending requests whose completion must be awaited), the handler 30 immediately returns a Success message to the fixture 32, and does not execute the asynchronous callback provided in the Destroy Channel message.

If there are requests in progress, the handler 30 returns a Pending message to the fixture 32 and then awaits completion of existing requests that the fixture 32 may be processing. The handler 30 then destroys the FCC-related data which frees the Handle, then executes the asynchronous callback routine after all in-progress requests complete.

Figure 5:
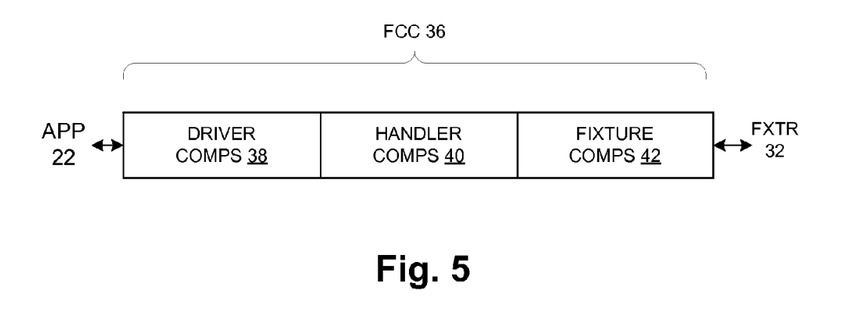
FIG. 5 is a schematic depiction of a fixture communication channel.

FIG. 5 is a schematic depiction of an FCC 36 after creation by the process of FIG. 3. It is shown as including three sets of components referred to as driver components (COMPS) 38, handler components 40 and fixture components 42. These are described below. The components interact to provide an end-to-end communication mechanism (FCC 36) between the application 22 and the fixture 32.

Figure 6:
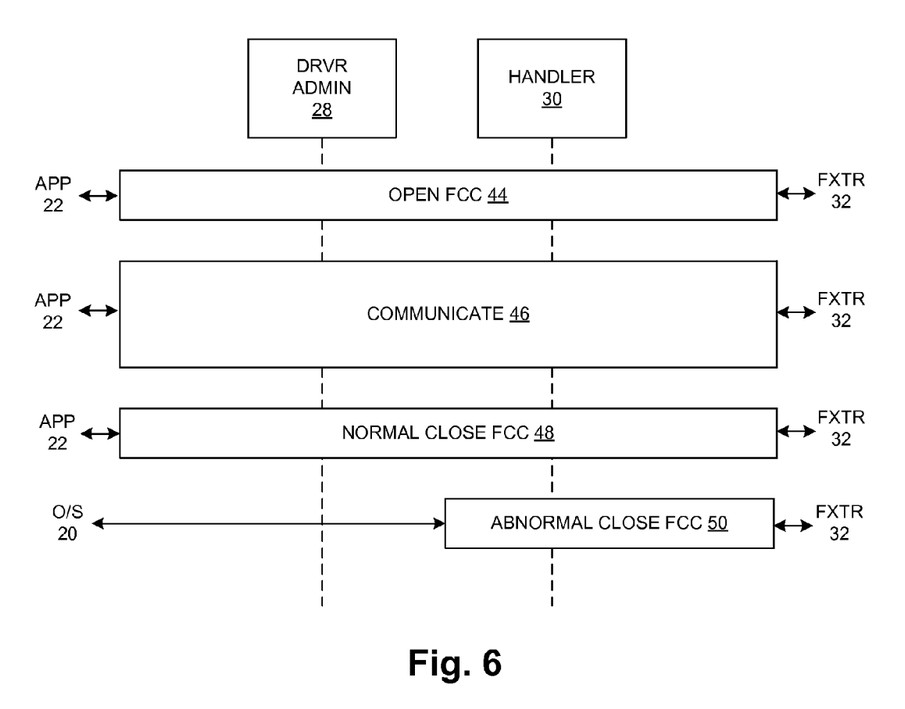
FIGS. 6-10 are message flow diagrams.

FIG. 6 is a summary representation of messaging for four types of operations on an FCC 36, namely an Open procedure 44, a Communicate procedure 46, a Normal Close procedure 48 and an Abnormal Close procedure 50. The Normal Close procedure 48 typically occurs when the application 22 terminates normally, while the Abnormal Close procedure 50 is an alternative that occurs when the application 22 terminates abnormally and thus is not able to initiate the Normal Close procedure 48. In this case the O/S 20 is responsible for closing the FCC 36. Detailed operation and messaging for each procedure is described in turn below with reference to FIGS. 7-10.

One important feature of the description below is the use of only three IOCTL commands for all FCC operations—Open FCC, Control FCC, and Close FCC. The Control FCC IOCTL command is used to transport a variety of types of fixture control messages and responses between the application 22 and fixture 32, without requiring intermediate components (e.g., driver administrator 28) to recognize and process such control messages or responses. These three IOCTL commands are referred to as fixture-control IOCTL commands, distinguishing them from other types of IOCTL commands normally supported by an OS and its drivers.

Figure 7:
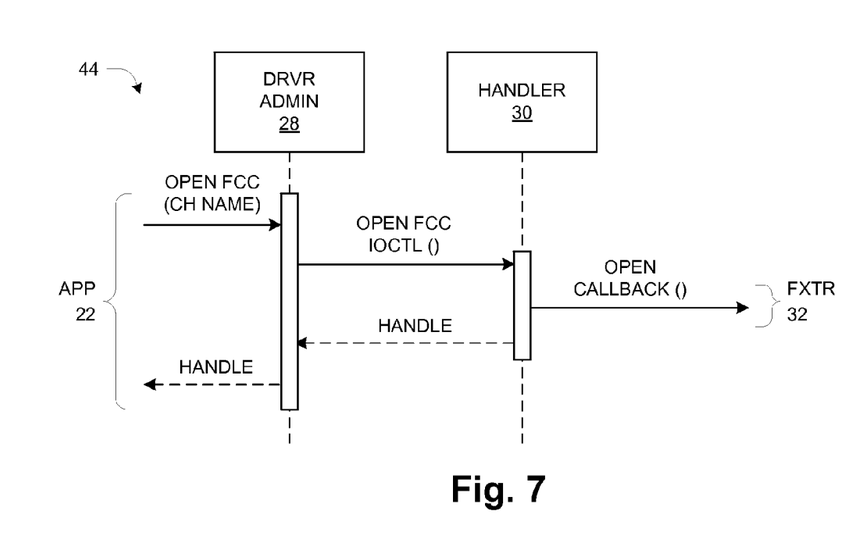

The following are examples of IOCTL commands, which may be operating-system-specific:
IOCTL_DISK_GET_DRIVE_GEOMETRY
IOCTL_DISK_GET_PARTITION_INFO
IOCTL_DISK_SET_PARTITION_INFO
IOCTL_DISK_GET_DRIVE_LAYOUT
IOCTL_DISK_SET_DRIVE_LAYOUT The following are examples of MLU driver-specific IOCTLs:
IOCTL_MLU_CREATE_LUN
IOCTL_MLU_DESTROY_LUN
IOCTL_MLU_GET_LUN_PROPERTIES
IOCTL_MLU_SET_LUN_PROPERTIES FIG. 7 shows the Open procedure 44. It is initiated by the application 22 using a message shown as Open FCC, which includes as a parameter the Channel Name (CH NAME) used at the time of creation of the FCC as described above. The driver administrator 28 uses the Channel Name to identify the particular FCC, generates an Open FCC IOCTL command and sends it to the handler 30. This command includes the Channel Name as well as the object name of the Administrative Volume (described above). The Open FCC IOCTL command is one of only three custom types of IOCTL commands used in connection with the FCC 36, the other two being a Fixture Control IOCTL command and a Close FCC IOCTL command as described below. All the details of the communications between the application 22 and fixture 32 are carried as contents of Fixture Control IOCTL commands, the contents being understood and interpreted by the application 22 and fixture 32 and, to a limited extent as described below, the handler 30. The handler 30 and driver administrator 28 need not implement any complicated IOCTL command generating/parsing capability to support a variety of types of fixtures 32 having different specific communications with applications 22.

Continuing with the Open procedure 44 of FIG. 7, the handler 30 responds to the Open FCC IOCTL command by invoking an Open callback function of the fixture 32 (previously registered with handler 30 as described above). This callback includes as parameters the fixture context (established at FCC creation) and a reference to the application 22. The fixture 32 stores this reference for later use in communicating with the application 22 via the FCC 36. The fixture 32 may perform other tasks as part of its Open callback function.

As shown, the Handle is returned to the application 22 by the driver administrator 28 at completion of the Open procedure 44.

Figure 8:
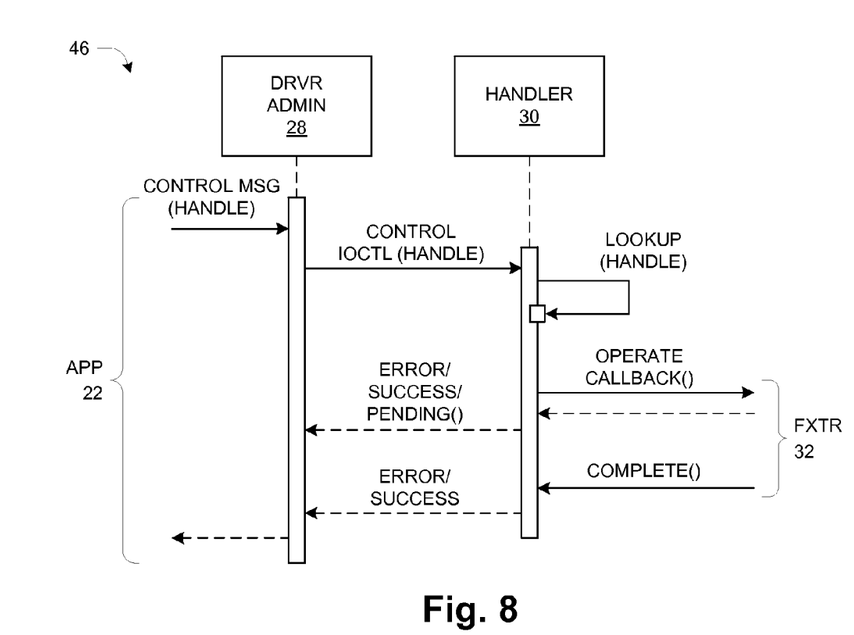

FIG. 8 shows the Communicate procedure 46 of FIG. 6. The application 22 generates a Fixture Control message (CONTROL MSG) having as parameters the Handle and an operation code specifying an operation to be performed by the fixture 32. The parameters also include pointers to one or more memory buffers that may be used for any data transfer forming part of the operation specified by the operation code. The driver administrator 28 responds by generating a Fixture Control IOCTL command (CONTROL IOCTL) and sending it to the handler 30. This IOCTL command includes as parameters the Handle, the operation code from the Fixture Control message, and the reference to the Administrative Volume. The handler 30 uses the Handle to lookup the corresponding fixture context, then invokes an Operate callback of the fixture 32 (previously registered with handler 30 as described above). The Operate callback includes as parameters the fixture context, the reference to application 22, the operation code from the Fixture Control IOCTL command, and a handler context pointing to a corresponding area of memory where the handler 30 reads and writes data of this transaction. The Operate callback invokes an Operate function of the fixture 32 that parses the operation code and causes the fixture 32 to perform a corresponding operation.

As shown, the handler 30 may immediately return a response to the Fixture Control IOCTL command having one of three types—Error, Success, or Pending. Error is returned whenever it will not be possible to eventually send a Success response. One example of an error condition is the receipt of an invalid or unrecognized Handle in the Fixture Control IOCTL command. An immediate Success response may be sent for certain types of low-latency operations, such as local status inquiries. In many cases the operation to be performed will take sufficiently long that there is benefit to "pending" the response, i.e., to release or unblock the driver administrator 28 and respond asynchronously at an unspecified later time. In these cases a Pending response is sent as soon as possible, which can be used by the driver administrator 28 and perhaps other actors to monitor and manage multiple in-progress operations. In normal cases, the fixture 32 eventually returns with a completion status, triggering the sending of a Success message by the handler 30 to the driver administrator 28. Under error conditions (e.g., no Completion received before some predetermined time-out period), an Error message is returned instead of Success.

Figure 9:
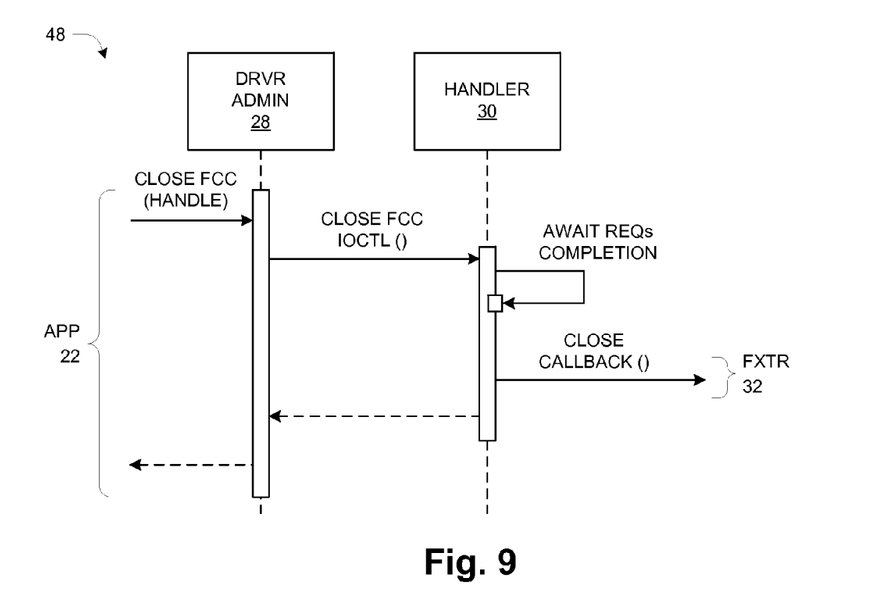

FIG. 9 illustrates the Normal Close procedure 48. This may be used to close the FCC 36 when the application 22 no longer needs to communicate with the fixture 32. The application 22 generates a Close FCC message, causing the driver administrator 28 to issue a Close FCC IOCTL command to the handler 30. The handler 30 awaits the completion of all preceding requests on this FCC that are still outstanding (not yet complete). It then executes the Close callback function of the fixture 32. The fixture 32 completes its processing in the context of the Close callback. If the fixture 32 returns an error, the driver administrator 28 completes the Close FCC IOCTL request with an error. If the fixture 32 returns success, then the driver administrator 28 completes the user space request.

Figure 10:
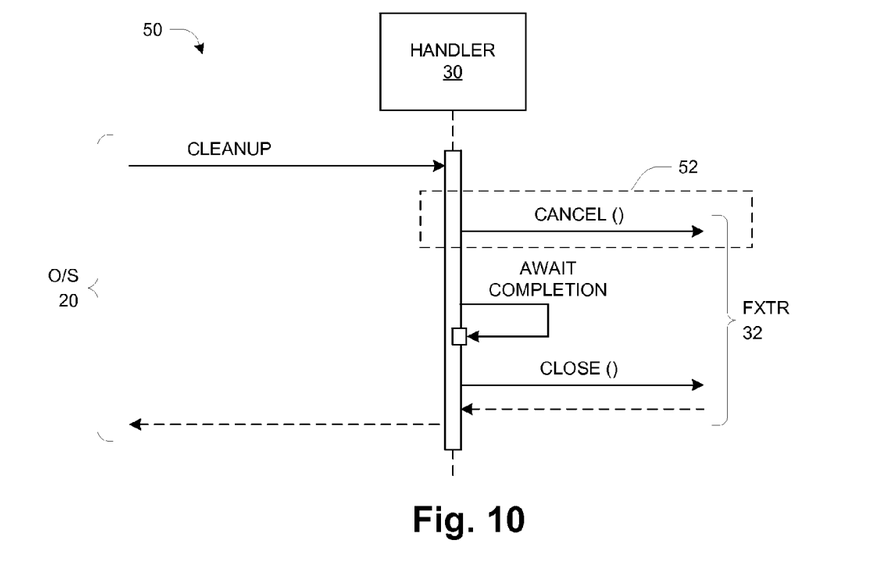

FIG. 10 illustrates the Abnormal Close procedure 50, initiated by the driver administrator 28 in the event that the application 22 terminates abnormally. In such a case, the driver administrator 28 receives "cleanup" IOCTL from the OS. The cleanup IOCTL includes a pointer to a File Object that represents the specific application 22 that terminated abnormally. The driver administrator 28 goes through all in-progress requests that originated from that application 22 and executes a Cancel callback of the fixture 32 for each such request. The driver administrator 28 waits on the completion of all in-progress requests that originated from the target application 22. Once all requests complete, the driver administrator 28 executes the Close callback of the fixture 32, and cleans up any remaining resources associated with the FCC 36.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a processor of a storage system, comprising:
   creating a fixture communication channel for communications between a fixture and another component of the storage system, the fixture being a component of a device driver providing extended input/output functionality with respect to a storage device accessed via the device driver, the fixture communication channel including a handle and a set of callbacks, the handle specifically identifying the fixture communication channel, the callbacks referencing respective callback functions of the fixture that provide the extended input/output functionality, and the callbacks being registered with a handler responsible for invoking the device driver in response to input/output control commands directed to the storage device, the input/output control commands being of a plurality of types including a fixture-control type; and
   using the fixture communication channel to convey contents of fixture communication messages between the another component and the fixture, each fixture communication message including the handle and a message-specific operation code for an operation to be performed by the fixture, each fixture communication message being conveyed by:
      generating an input/output control command of the fixture-control type and issuing it to the handler, the fixture-control input/output control command including the message-specific operation code and the handle from the fixture communication message; and
      at the handler, using the handle and message-specific operation code from the fixture-control input/output control command to select a corresponding callback and invoke a corresponding callback function of the fixture.

2. A method according to claim 1, wherein creating the fixture communication channel includes issuing a Create Channel command to the handler with information identifying the another component and the fixture, the Create Channel command causing the handler to create the handle as a unique identifier of the fixture communication channel for use by the another component.

3. A method according to claim 1, further including destroying the fixture communication channel by a process including issuing a Destroy Channel command to the handler, the Destroy Channel command causing the handler to (1) await completion of all in-progress operations, and (2) deactivate the handle to cause future references to the handle to be treated as invalid and result in return of an error indication.

4. A method according to claim 1, wherein using the fixture communication channel is preceded by an Open procedure and followed by a Close procedure, the Open procedure including use of an Open input-output control command causing activation of the handle and providing the handle to the another component for use in generating the fixture communication messages, the Close procedure including use of a Close input-output control command causing deactivation of the handle such that subsequent fixture communication messages using the handle receive an error response indicating an invalid handle value.

5. A method according to claim 4, wherein the another component is an application and the Close procedure is a Normal Close procedure initiated by the application, and further including use of an Abnormal Close procedure initiated by an operating system under conditions in which the application will not initiate the Normal Close procedure, the Abnormal Close procedure including:
   receiving a cleanup command from the operating system; and
   in response to receiving the cleanup command:
      executing a Cancel callback of the fixture for each requested operation that has not yet completed;
      awaiting completion by the fixture of all requested operations; and
      executing a Close callback of the fixture.

6. A method according to claim 1, wherein:
the extended input/output functionality provided by the fixture includes data compression functionality;
the callback functions of the fixture include a data compression function and a data decompression function, the data compression function being operative to apply compression to uncompressed data to reduce usage of storage space, the decompression function being operative to apply decompression to compressed data from the storage device to recover the uncompressed data; and
operation codes of the fixture communication messages include a Compress operation code and a Decompress operation code, the Compress operation code corresponding to the data compression function, the Decompress operation code corresponding to the data decompression function.

7. A method according to claim 1, wherein:
the extended input/output functionality provided by the fixture includes data deduplication functionality;
the callback functions of the fixture include a digest computation function operative to calculate deduplication checksums or hashes for data of the storage device enabling identification of duplicate data; and
operation codes of the fixture communication messages include a compute digest operation code corresponding to the digest computation function.

8. A storage system, comprising:
a set of storage devices;
a processor coupled to the storage devices to perform data storage operations thereon; and
interface circuitry coupling the storage system to external users of the storage system;
the processor being operative to execute computer program instructions to cause the processor to perform a method including:
  creating a fixture communication channel for communications between a fixture and another component of the storage system, the fixture being a component of a device driver providing extended input/output functionality with respect to a storage device accessed via the device driver, the fixture communication channel including a handle and a set of callbacks, the handle specifically identifying the fixture communication channel, the callbacks referencing respective callback functions of the fixture that provide the extended input/output functionality, and the callbacks being registered with a handler responsible for invoking the device driver in response to input/output control commands directed to the storage device, the input/output control commands being of a plurality of types including a fixture-control type; and
  using the fixture communication channel to convey contents of fixture communication messages between the another component and the fixture, each fixture communication message including the handle and a message-specific operation code for an operation to be performed by the fixture, each fixture communication message being conveyed by:
    generating an input/output control command of the fixture-control type and issuing it to the handler, the fixture-control input/output control command including the message-specific operation code and the handle from the fixture communication message; and
    at the handler, using the handle and message-specific operation code from the fixture-control input/output control command to select a corresponding callback and invoke a corresponding callback function of the fixture.

9. A storage system according to claim 8, wherein the processor is operative when creating the fixture communication channel to issue a Create Channel command to the handler with information identifying the another component and the fixture, the Create Channel command causing the handler to create the handle as a unique identifier of the fixture communication channel for use by the another component.

10. A storage system according to claim 8, wherein the method performed by the processor further includes destroying the fixture communication channel by a process including issuing a Destroy Channel command to the handler, the Destroy Channel command causing the handler to (1) await completion of all in-progress operations, and (2) deactivate the handle to cause future references to the handle to be treated as invalid and result in return of an error indication.

11. A storage system according to claim 8, wherein using the fixture communication channel is preceded by an Open procedure and followed by a Close procedure, the Open procedure including use of an Open input-output control command causing activation of the handle and providing the handle to the another component for use in generating the fixture communication messages, the Close procedure including use of a Close input-output control command causing deactivation of the handle such that subsequent fixture communication messages using the handle receive an error response indicating an invalid handle value.

12. A storage system according to claim 11, wherein the another component is an application and the Close procedure is a Normal Close procedure initiated by the application, and wherein the method performed by the processor further includes use of an Abnormal Close procedure initiated by an operating system under conditions in which the application will not initiate the Normal Close procedure, the Abnormal Close procedure including:
receiving a cleanup command from the operating system; and
in response to receiving the cleanup command:
  executing a Cancel callback of the fixture for each requested operation that has not yet completed;
  awaiting completion by the fixture of all requested operations; and
  executing a Close callback of the fixture.

13. A storage system according to claim 8, wherein:
the extended input/output functionality provided by the fixture includes data compression functionality;
the callback functions of the fixture include a data compression function and a data decompression function, the data compression function being operative to apply compression to uncompressed data to reduce usage of storage space, the decompression function being operative to apply decompression to compressed data from the storage device to recover the uncompressed data; and
operation codes of the fixture communication messages include a Compress operation code and a Decompress operation code, the Compress operation code corresponding to the data compression function, the Decompress operation code corresponding to the data decompression function.

14. A storage system according to claim 8, wherein:
the extended input/output functionality provided by the fixture includes data deduplication functionality;
the callback functions of the fixture include a digest computation function operative to calculate deduplication checksums or hashes for data of the storage device enabling identification of duplicate data; and operation codes of the fixture communication messages include a compute digest operation code corresponding to the digest computation function.

* * * * *